US009350562B2

(12) United States Patent
Jiang (10) Patent No.: US 9,350,562 B2
(45) Date of Patent: May 24, 2016

(54) ENERGY MANAGEMENT CONTROL SYSTEM AND METHOD BASED ON CLOUD COMPUTING

(75) Inventor: Yongdong Jiang, Beijing (CN)

(73) Assignee: LONGDHUA (BEIJING) CONTROLS TECHNOLOGY CO., LTD., Beijing (CN)

( * ) Notice: Subject to any disclaimer, the term of this patent is extended or adjusted under 35 U.S.C. 154(b) by 632 days.

(21) Appl. No.: 13/582,767

(22) PCT Filed: Sep. 7, 2010

(86) PCT No.: PCT/CN2010/001365
§ 371 (c)(1),
(2), (4) Date: Nov. 19, 2012

(87) PCT Pub. No.: WO2011/106917
PCT Pub. Date: Sep. 9, 2011

(65) Prior Publication Data
US 2013/0066477 A1 Mar. 14, 2013

(30) Foreign Application Priority Data
Mar. 5, 2010 (CN) .......................... 2010 1 0120081

(51) Int. Cl.
G06F 1/32 (2006.01)
H04L 12/28 (2006.01)
G01D 4/00 (2006.01)

(52) U.S. Cl.
CPC ............ H04L 12/2823 (2013.01); G01D 4/002 (2013.01); G05B 2219/25387 (2013.01); Y02B 90/241 (2013.01); Y02B 90/244 (2013.01); Y04S 20/32 (2013.01); Y04S 20/327 (2013.01)

(58) Field of Classification Search
None
See application file for complete search history.

(56) References Cited

U.S. PATENT DOCUMENTS

| 2007/0255461 | A1* | 11/2007 | Brickfield et al. ............ 700/295 |
| 2009/0157529 | A1* | 6/2009 | Ehlers et al. .................... 705/26 |
| 2009/0195349 | A1* | 8/2009 | Frader-Thompson et al. 340/3.1 |
| 2009/0240380 | A1* | 9/2009 | Shah et al. ..................... 700/295 |

(Continued)

FOREIGN PATENT DOCUMENTS

| CN | 1804920 | 7/2006 |
| CN | 101393451 | 3/2009 |

(Continued)

OTHER PUBLICATIONS

International Search Report for PCT/CN2010/001365, mailed Dec. 16, 2010.

*Primary Examiner* — Mohammad Ali
*Assistant Examiner* — Bernard G Lindsay
(74) *Attorney, Agent, or Firm* — Nixon & Vanderhye PC (57) ABSTRACT

An energy source management control system based on cloud computing may include a field controller, an energy consumption parameter collector and a cloud computing management control platform. The field controller may control each energy consumption device according to user defined parameters and send the user defined parameters to the cloud computing management control platform. The energy consumption parameter collector may collect parameters related to energy consumption of each energy consumption device and send the collected parameters to the cloud computing management control platform. The cloud computing management control platform may adjust a field control mode of the field controller according to the collected parameters related to energy consumption of each energy consumption device and the user defined parameters.

7 Claims, 3 Drawing Sheets

(56) References Cited

U.S. PATENT DOCUMENTS

2009/0259346 A1 10/2009 Reed et al.
2009/0300210 A1 12/2009 Ferris

FOREIGN PATENT DOCUMENTS

CN 101621881 1/2010
JP 2009-296880 12/2009

* cited by examiner

ENERGY MANAGEMENT CONTROL SYSTEM AND METHOD BASED ON CLOUD COMPUTING

FIELD OF THE INVENTION

The present invention relates to the field of energy management control, more specifically, to an energy management control system based on cloud computing and method thereof.

BACKGROUND OF THE INVENTION

An energy management control system capable of saving energy has become increasingly significant as the energy resources throughout the world become scarce gradually.

Generally, the energy management control system of the prior art employs the conventional electric automation technique in which the energy consumption management control is performed on individual energy consumption devices in a single object (such as malls, stores, hotels, office buildings, industrial premises), which belongs to the control of field level. If the manufacturers are different, the used management and energy-saving platforms are different as well. Consequently, the platforms may be incompatible mutually, and may lack communication among them. As such, no unitary platform can be formed to carry out the unitary energy consumption management control in a centralization manner for maximization of the energy saving.

U.S. TRIDIUM Corporation has firstly developed a unitary platform system for energy management, which can be compatible with other energy management platforms and can provide the reference data of the energy consumption for the user. However, the present inventor has found the following problems existing in this platform:

1. the system encounters the problems of lower processing speed and incapability of data protection when coping with a large amount of history data;

2. the system fails to perform a comprehensive energy statistics, analysis and management control in terms of energy factor, energy scenario, energy index, management system, energy consumption reference benchmark, energy performance, energy statistics, energy optimization and the like, and only the statistical results for the energy consumption are provided to the user. Thus, the user has to modify the field control mode in accordance with the statistical results by themselves thereby the optimal deployment of energy cannot be obtained.

Cloud computing is a kind of network technique that is developed in recent years, which distributes the computation task over a resource pond constituted by a substantial mount of computers, and enables various application systems to acquire computability, storage space and various software services according to individual demands. Each of the IT corporations, such as Google, Microsoft, Yahoo, Amazon, etc., proposes its own cloud computing platform service based on cloud computing successively. The characteristics of the cloud computing can be summed up as below:

(1) Grand Scale

The scale of "cloud" is considerable. The cloud computing of Google, for example, holds more than 1 million servers, and the "cloud" of Amazon, IBM, Microsoft, Yahoo and the like holds several hundred thousands servers, respectively. Typically, the private cloud of an enterprise holds several hundreds and thousands servers; therefore, "cloud" is capable of imparting the unprecedented computability to the user.

(2) Virtualization

The cloud computing enables the user to acquire the application service by using any terminal at any location. The requested resource comes from the "cloud" rather than a fixed tangible entity. The application runs at some location within the "cloud", and it is unnecessary for the user to know or worry about the specific location where the application runs. Any service for what we need, even including such a task as supercomputing, can be achieved through network service by only one laptop or one cellphone.

(3) High Reliability

The "cloud" adopts the measures such as fault-tolerance by multiple data copies, interchangeability of the computing nodes with the same structure to ensure the high reliability of service, that is, the cloud computing is more reliable than a local computer.

(4) Universality

The cloud computing does not aim at a particular application, and versatile applications can be constructed with the support of the "cloud". Particularly, the same "cloud" can support the running of different applications at the same time.

(5) Highly Expandability

The scale of the "cloud" can be scaled up and down dynamically to meet the increased demand in the scale of applications and user.

(6) Servicing as Needed

The "cloud" is a huge resource pond, and the user can purchase in light of his/her need, wherein the cloud may be charged as tap water, electricity and gas.

(7) Extremely Inexpensive

The automatic centralized management of the "cloud" enables a substantial amount of corporations to be free from the cost of data center management that is increasingly high and the universality of the "cloud" increase the utilization rate of the resource compared with that of the conventional system greatly by virtue of the fact that the special fault-tolerance measures of the "cloud" make it possible to use the extremely inexpensive nodes to constitute the cloud. Accordingly, the user can benefit from the advantage of lower cost of the "cloud" sufficiently and the tasks, previously completed within several months at the expense of several tens of thousand dollars, can generally be accomplished within several days at the expense of several hundred dollars.

SUMMARY OF THE INVENTION

To solve the above problems in the prior art, the object of the present invention is to provide an energy management control system and method based on cloud computing capable of being compatible with the energy-saving platforms from all various manufacturers, performing a centralized energy management control on many objects on a unitary platform, and achieving the management of energy saving and the automated network control up to a maximum limit, thereby arriving at the optimal deployment of energy and better energy-saving effect.

To achieve the above object, the present invention provides an energy management control system based on cloud computing, comprising:

a field controller for field controlling each energy consumption device according to user defined parameters and sending the user defined parameters to a cloud computing management control platform;

an energy consumption parameter collector for collecting parameters related to energy consumption of each energy consumption device and sending the collected parameters to the cloud computing management control platform, the energy consumption parameter collector is generally comprised of various sensors with the function of network transmission, data statistic and gathering unit, data analyzing and uploading unit and so on, whose actual number is set as needed; and the cloud computing management control platform for adjusting a field control mode of the field controller for each energy consumption device according to the collected parameters related to energy consumption of each energy consumption device and the user defined parameters.

Preferably, the cloud computing management control platform specifically comprises:

a receiving unit for receiving the parameters related to energy consumption of each energy consumption device collected by the energy consumption parameter collector and the user defined parameters;

a first determining unit for determining whether the collected parameters related to energy consumption of each energy consumption device and the user defined parameters are matched with each other and generating a determination result;

an energy consumption model generating unit for generating the corresponding energy consumption models according to the parameters related to energy consumption of each energy consumption device when the determination result of the first determination unit is positive;

a data base for history energy consumption models for storing various types of history energy consumption models;

a second determining unit for determining whether the generated energy consumption models and the corresponding history energy consumption models in the data base for history energy consumption models are matched with each other and generating the determination result; and a control mode adjusting unit for adjusting the field control mode of the field controller for each energy consumption device when the determination result of the first determination unit or the second determination unit is negative.

Preferably, the parameters related to energy consumption of each energy consumption device include the real-time energy consumption parameters, the operating parameters and the safety parameters, in which the real-time energy consumption parameters usually refer to the parameter of quantity of electricity for each energy consumption device directly collected by the electricity metering device, the operating parameters include the temperature, humidity, air volume, operating time, frequency and the like, which are parameters related to the operating of each energy consumption device, and the safety parameters include the related parameters for each energy consumption device in the case of in operation, in malfunction, warning and the like.

Preferably, the corresponding history energy consumption models in the data base for history energy consumption models refer to the history energy consumption models wherein the energy consumption restriction parameters, which include one of the application environment parameters, design parameters, the application place-type parameters and the energy supply-type parameters of each energy consumption device or the combination thereof, and the generated energy consumption models are matched with each other. In the data base for history energy consumption models, various history energy consumption models conforming to the trade standards (i.e., design standards) exists. These history energy consumption models are obtained considering the evaluation standards such as energy consumption benchmark, efficiency benchmark, achievements benchmark and the like, and thus the energy consumption is relatively most reasonable. The establishment of the history energy consumption models is usually restricted by the energy consumption restriction parameters. The history energy consumption models are varied along with different energy consumption restriction parameters. The application environment parameters of each energy consumption device include a geographic location and climate parameters and the like. The design parameters include design power, measurement range, design energy consumption parameters, design energy efficiency and the like. The application place-type parameters include malls, supermarkets, hotels, office buildings, exhibition halls, computer rooms, industrial premises, houses and State Grid and the like. The energy supply-type parameters of each energy consumption device include coal, electric power, natural gas, oil, biomass energy, heat energy, regeneration energy and the like. Of course, energy consumption restriction parameters may comprise other one, for example, the control mode and the like.

To achieve the above object, the present invention further provides an energy management control method based on cloud computing, comprising:

a step S11 of field controlling each energy consumption device according to user defined parameters and sending the user defined parameters to the cloud computing management control platform;

a step S12 of collecting parameters related to energy consumption of each energy consumption device and sending the collected parameters to the cloud computing management control platform; and a step S13 of adjusting a field control mode of the field controller for each energy consumption device according to the collected parameters related to energy consumption of each energy consumption device and the user defined parameters on the cloud computing management control platform.

Preferably, the step S13 specifically comprises:

a step S131 of determining whether the collected parameters related to energy consumption of each energy consumption device and the user defined parameters are matched with each other, performing a step S135 if they are unmatched with each other, and performing a step S132 if they are matched with each other;

the step S132 of generating the corresponding energy consumption models according to the parameters related to energy consumption of each energy consumption device;

a step S133 of determining whether the generated energy consumption models and the corresponding history energy consumption models in the data base for history energy consumption models are matched with each other, performing the step S135 if they are unmatched with each other, and performing a step S134 of maintaining the control mode for each energy consumption if they are matched with each other; and the step S135 of adjusting the field control modes for each energy consumption device.

Preferably, the method further comprises a step S136 of adding the generated energy consumption models into the data base for history energy consumption models following the step S134.

Preferably, the corresponding history energy consumption models in the data base for history energy consumption models refer to the history energy consumption models wherein the energy consumption restriction parameters, which include one of the application environment parameters, design parameters, the application place-type parameters and the energy supply-type parameters of each energy consumption device or the combination thereof, and the generated energy consumption models are matched with each other.

Preferably, the parameters related to energy consumption of each energy consumption device include the real-time energy consumption parameters, the operating parameters and the safety parameters.

Preferably, the parameters related to energy consumption of each energy consumption device each are sent to the cloud computing management control platform through any one of the wireless Internet network, wired Internet network, general packet radio service network and third generation mobile communication network, and a more developed next generation transmission network.

The present invention has the advantages of being compatible with the energy-saving platforms from all various manufacturers, performing a centralized energy management control on many objects on a unitary platform, and achieving the management of energy saving and automated network control up to a maximum limit, thereby arriving at the optimal deployment of energy and better energy-saving effect.

BEST EMBODIMENTS OF THE PRESENT INVENTION

Hereinafter, the embodiments of the present invention will be described in detail with reference to the accompanying drawings.

Figure 1:
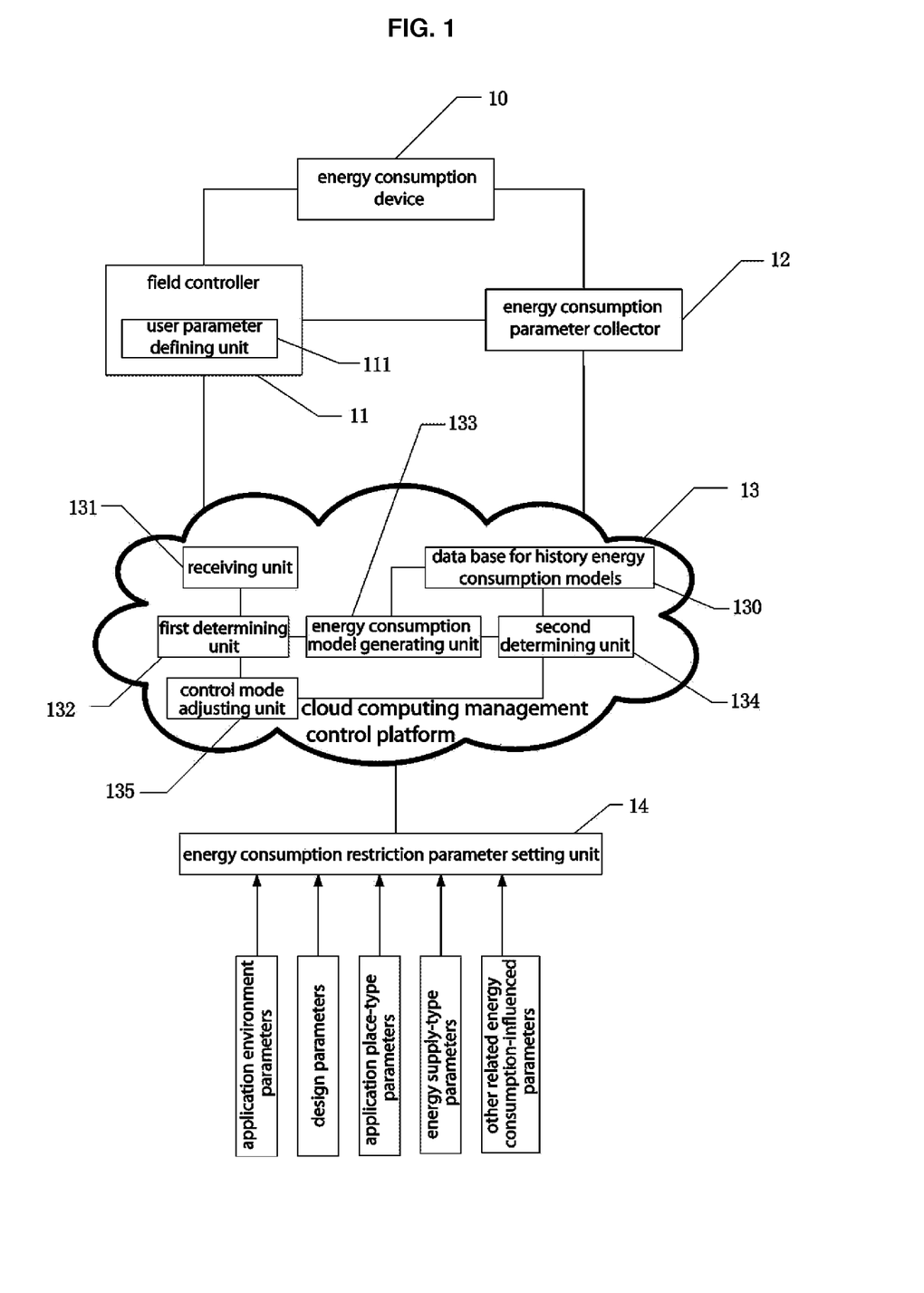
FIG. 1 is the view schematically illustrating the structure of an energy management control system based on cloud computing according to an embodiment of the present invention.

FIG. 1 is the view schematically illustrating the structure of an energy management control system based on cloud computing according to an embodiment of the present invention. The energy management control system based on cloud computing comprises:

a field controller 11 for field controlling each energy consumption device 10 according to user defined parameters and sending the user defined parameters to the cloud computing management control platform 13; the field controller 11 includes a user parameter defining unit 111 for defining the parameters by the user; for example, when the energy consumption device is an air conditioner, then the user defined the parameters such as the temperature and the air volume of the air conditioner, and so on, and sends the defined parameters to the cloud computing management control platform 13;

an energy consumption parameter collector 12 for collecting the parameters related to energy consumption of each energy consumption device 10 and sending the parameters to a cloud computing management control platform 13; the parameters related to energy consumption of each energy consumption device include the real-time energy consumption parameters, the operating parameters and the safety parameters, in which the real-time energy consumption parameters usually refer to the parameter of quantity of electricity for each energy consumption device directly collected by the electricity metering device, the operating parameters include the temperature, humidity, air volume, operating time, frequency and the like, which are parameters related to the operating of each energy consumption device, and the safety parameters include the related parameters for each energy consumption device in the case of in operation, in malfunction, warning and the like. The energy consumption parameter collector 12 is generally comprised of various sensors with the function of network transmission, data statistic and gathering unit, data analyzing and uploading unit and so on, completing the function of collection, initial statistic and analyzing for the data, whose actual number is set as needed, and many energy consumption parameter collectors may be provided. The sensors may be various sensors such as the temperature sensor, the humidity sensor, the air volume sensor, the electricity degree meter sensor, the air velocity sensor, the sensor for the enthalpy and entropy values of the air, and the like; the collected energy consumption parameters are sent to the cloud computing management control platform 13 through the communication network, which may be a wireless Internet network, a wired Internet network, a general packet radio service network and a third generation mobile communication network, or a more developed next generation transmission network, and so on;

the cloud computing management control platform 13 for adjusting the field control mode of the field controller for each energy consumption device according to the collected parameters related to energy consumption of each energy consumption device 10 and the user defined parameters; the object of the adjustment is to achieve the optimal deployment of energy so as to reduce the energy consumption, the cloud computing management control platform 13 according to the present embodiment specifically comprising:

a receiving unit 131 for receiving the parameters related to energy consumption of each energy consumption device 10 collected by the energy consumption parameter collector 12 and the user defined parameters;

a first determining unit 132 for determining whether the collected parameters related to energy consumption of each energy consumption device 10 and the user defined parameters are matched with each other and generating the determination result;

an energy consumption model generating unit 133 for generating the corresponding energy consumption models according to the parameters related to energy consumption of each energy consumption device when the determination result of the first determination unit is positive, the energy consumption models include the indices such as the whole energy consumption and the energy consumption in operation, and the like;

a data base for history energy consumption models 130 for storing various types of history energy consumption models, in which various history energy consumption models conforming to the trade standards (i.e., design standards) and the optimal energy consumption models promised or accepted by related documents such as criterions, standards, and so on, exists; these history energy consumption models are obtained considering the evaluation standards such as energy consumption benchmark, efficiency benchmark, achievements benchmark and the like, and thus the energy consumption is relatively most reasonable;

a second determining unit 134 for determining whether the generated energy consumption models and the corresponding history energy consumption models in the data base for history energy consumption models are matched with each other and generating the determination result; the establishment of the history energy consumption models are usually restricted by the energy consumption restriction parameters. The history energy consumption models are varied along with different energy consumption restriction parameters. The energy consumption restriction parameters include one of the application environment parameters including a geographic location and climate parameters and the like, design parameters including design power, measurement range, design energy consumption parameter, design energy efficiency and the like, the application place-type parameters including malls, supermarkets, hotels, office buildings, exhibition halls, computer rooms, industry premises, houses and State Grid and the like, and the energy supply-type parameters of each energy consumption device including coal, electric power, natural gas, oil, biomass energy, heat energy, regeneration energy and the like, or the combination thereof or the combination thereof with other restriction parameters, for example, the control mode. The user inputs the current generated energy consumption restriction parameters through the energy consumption restriction parameter setting unit 14, and then searches the data base for history energy consumption models 130 for the corresponding history energy consumption models, which are the history energy consumption models wherein the energy consumption restriction parameters and the generated energy consumption models are matched with each other, according to these energy consumption restriction parameters, and determining whether the generated energy consumption models and the corresponding history energy consumption models are matched with each other, and if they are unmatched with each other, it shows that the energy consumption is unreasonable and needs to be adjusted; for example, if the annual energy consumption per unit area in the generated energy consumption models is 200-300 kWh, and the annual energy consumption per unit area of the history energy consumption models having the same energy consumption restriction parameter is around 100 KWh, it shows that the energy consumption of the generated energy consumption models is unreasonable and needs to be adjusted; and a control mode adjusting unit 135 for adjusting the field control mode of the field controller for each energy consumption device when the determination results of the first determination unit 132 or the second determination unit 134 are negative; the negative result shows that the energy consumption does not meet the requirement and the field control mode needs to be adjusted so as to reduce the energy consumption until the energy consumption meets the requirement, whereby the optimal deployment for the energy consumption is achieved; if the determination result of the first determination unit 132 is negative, it shows that the energy consumption cannot arrive at the requirement set by the user and needs to be adjusted directly; if the determination result of the second determination unit 134 is negative, it shows that the energy consumption is not the optimal one for which the evaluation standards such as energy consumption benchmark, efficiency benchmark, achievements benchmark and the like are considered although the energy consumption can arrive at the requirement set by the user, and thus it is necessary to perform the adjustment so as to further reduce the energy consumption; if the determination result of the second determination unit 134 is positive, which shows that the generated energy consumption models are reasonable and meet the requirement, then the generated energy consumption models are added into the data base for history energy consumption models to enrich the history data and functions as a reference for the later energy consumption management control.

Of course, there are many kinds of control modes of the cloud computing management control platform 13 for the field controller 11, and only one control mode is described in the above embodiment.

For user's convenience, the energy management control system based on cloud computing according to the present embodiment may be provided with a visual display interface through which the user can perform the management control.

The advantage for performing the energy management control by using the cloud computing management control platform 13 is very obvious. The grand-scale energy consumption centralized control may be achieved due to the scalability and extendibility characteristic of the cloud computing. Theoretically, any kind of the energy management control around the world may be achieved, including the energy consumption management control for the building, the energy consumption management control for the power transmission and so on. Therefore, a wider application range may be obtained. The energy management control may be performed by each user due to the characteristic of virtualization of the cloud computing, without an individual configuration of a separate energy management control platform. Rather, it can be obtained in the "cloud" as needed. Therefore, the cost is substantially reduced. The history data within the whole control platform is quite rich as a result of the characteristic of the resource sharing of the cloud computing. The optimal history data may be matched as a reference, so that the optimal deployment of energy may be achieved.

Hereinafter, the application process of the energy management control system based on cloud computing according to the present embodiment will be described, by an example of the energy consumption management control of a certain building.

This building is a kind of business one located at somewhere, the total building area of which is about 38,000 $cm^2$. The construction of the building is designed to be a combination of a reinforced concrete frame with a core barrel without posts. The energy consumption devices comprise essentially cooling and heating source systems, an air conditioner venting system, a water supplying and draining system, an illuminator socket system, an elevator system, a large power device system and the like. A part of the design reference standards are described as below:

1. the cooling source of the air conditioner is an electrical refrigeration system with a temperature of the supplied water being at 7° C. and a temperature of the returned water being at 12° C. The heating source of the air conditioner is hot water of high temperature from municipal service with the temperature of the supplied water of the municipal water being at 110° C. and the temperature of the returned water being at 70° C. The hot water within the air conditioner is supplied out after heat exchange with the temperature of the supplied water of the air conditioner water being at 60° C. and the temperature of the returned water being at 50° C.;

2. the working pressure for both a freezing water system and a cooling water system is at 1.5 MPa, and the experimental pressure thereof is at a value of working pressure plus 0.5 MPa. The working pressure of a hot water system is at 1.5 MPa, and the experimental pressure thereof is at a value of working pressure plus 0.5 MPa;

3. a sensing device for sensing an enthalpy value of the air is disposed outdoor, the control for which may be performed at a maximum limit in the manner of whole fresh air as the enthalpy and entropy values of outdoor air vary so as to achieve the object of energy saving; the examples of the specific control strategy for the fresh air system of the whole year are given as follows:

A. in the season of air conditioning, when the temperature of the return air is lower than that of the outdoor fresh air by 4° C., for example, and the enthalpy value of the return air is lower than that of the fresh air by 4 KJ/Kg, for example, the rotary heat recovery device is activated, and the operation of the heat recovery for the exhaust air is started; and when the temperature of the return air is lower than that of the outdoor fresh air by less than 4° C. for a period of time, the rotary heat recovery device is stopped and the process turns to the operation of by-pass fresh air;

B. in the season of air conditioning, the fresh air unit and the air exhaust unit operate with maintaining the minimum ratio of the fresh air; when the concentration of $CO_2$ is higher than the set value, the set value of the air volume of the constant air-volume valve (CAV) for the fresh exhaust air is increased to increase the fresh air volume; and when the concentration of $CO_2$ is lower than the lower limit of the set value, the set value of the air volume of the constant air-volume valve (CAV) for the fresh exhaust air is reduced to reduce the fresh air volume;

C. when the enthalpy value of the outdoor air is lower than the set enthalpy value for activating the whole fresh air (the designed indoor enthalpy value is assumed as 5 KJ/Kg), the operation of the whole fresh air is started, and the fresh air valve of the air conditioner case in the transitional season is opened and the return air valve is closed, and all of head fresh air units and head exhaust air units are activated in an interlocked manner; when the fresh air can not remove the residual indoor heat completely, the opening degree of the water valve of the air conditioner case is controlled according to the indoor temperature; when the whole fresh air can completely remove the residual heat indoor, the water valve of the air conditioner case is closed; and when the temperature of the fresh air is excessively low, the fresh air valve and the return air valve are adjusted according to the value of the indoor temperature to reduce the fresh air volume and increase the return air volume, respectively, so that the fresh air unit and the air supply unit are operated at varied frequencies;

D. in the operation with the whole fresh air, when the enthalpy value of the outdoor air is higher than the set enthalpy value for starting the operation with the whole fresh air, the operation with the whole fresh air is stopped and the operation of the season of the air conditioning is started;

4. an indoor temperature is designed as follows: it is at 25° C. and the relative humidity is 55% in summer; it is at 20° C. and the relative humidity is 30% in winter; and the fresh air volume is 50 $cm^3$/person/hour.

5. the reference values of outdoor parameters:
the computed outdoor dry-bulb temperature in case of air conditioning in summer is 33.2° C.;
the computed outdoor wet-bulb temperature in case of air conditioning in summer is 26.4° C.;
the computed outdoor temperature in case of ventilation in summer is 30° C.;
the average outdoor air velocity in summer is 1.9 m/s;
the computed outdoor dry-bulb temperature in case of air conditioning in winter is −12° C.;
the computed outdoor relative humidity in case of air conditioning in winter is 45%;
the computed outdoor dry-bulb temperature in case of heating in winter is −9° C.;
the computed outdoor temperature in case of ventilation in winter is −5° C.; the average outdoor air velocity in winter is 2.8 m/s.

the reference standard for trade energy consumption per unit building area in different types of buildings is generalized as below:

1. the energy consumption of the office-kind building is relatively lower, and the annual power consumption per unit area is about 100 kWh;

2. the power consumption of the hotel-kind building is relatively higher, and the annual power consumption per unit area is about 100-200 kWh;

3. the number of the power consumption devices of the mall-kind building is relatively great, wherein the number of the illuminating lamps is great and the capacity of the devices of the air conditioning system is large and the operating time thereof is long. Therefore, the annual power consumption amount per unit area in the mall-kind building is great and is substantially 200-300 kWh;

4. the integrated business building is an architectural complex including various types of buildings. Because the area proportion of various buildings is different, the change in the energy consumption thereof is different as well. In sum, the annual power consumption amount per unit area in the integrated business building is 100-300 kWh.

The energy management control process that is performed on the buildings by the energy consumption management control system based on cloud computing is described below.

1) Performing Sensor Detection and Data Information Recording by the Layer of Field Device The layer of field device includes an energy consumption parameter collector 12 (generally, various sensors) that mainly collects various signals and a field controller 11 that mainly performs a field control on the corresponding energy consumption devices.

All the signals are directly sent to the IP network through a switchboard and can be uploaded to the signal collection, storage, statistics and analysis databases of the energy consumption management control system based on cloud computing via internet (which may be wireless manner or wired manner).

The relevant design parameters of the energy consumption device and the building is registered via a cloud computing platform, and subsequently the information is entered into the signal collection, storage, statistics, analysis and model databases of the energy management control system based on cloud computing.

The whole system framework is on the basis of Ethernet (LAN/WLAN), which adopts the TCP/IP protocol. The cloud computing management control platform can communicate with the field system (including the field controller and the energy consumption parameter collector) through the protocols such as oBIX, SNMP, XML and the like and obtain the data. The obtained data mainly include:

the data such as detailed state, malfunction and operation and the like of the control nodes;

summary table for warning;

energy consumption data of individual devices are calculated and recorded by an electricity metering sensor, the feedback of the inverter or by computation of the controller;

the relevant design parameters of all the energy consumption devices and the buildings.

2) Accomplishing the Data Analysis and Relevant Control by a Layer of Control and Analysis The controller of field level performs control of field level on the respective devices according to the detected signals and target defined parameters by the user in field, and uploads various signals to the signal collection, storage, statistic and analysis databases of the energy management control system based on cloud computing.

When the temperature control of the air conditioning unit is taken as an example, the control performed to the air conditioning unit by the field controller includes:

A. start-stop control: completing start-stop control with reference to a start-stop command signal.

B. adjustment and control of the temperature and the humidity: during winter, the opening degree of the water valve is reduced by PID control when the indoor temperature or air supply temperature is above the set value (T=20° C.), while the opening degree of the water valve is increased when the indoor temperature or air supply temperature is below the set value. During summer, the opening degree of the water valve is increased by the PID control when the indoor temperature or air supply temperature is above the set value (T=26° C.), while the opening degree of the water valve is reduced when the indoor temperature or air supply temperature is below the set value. The same applies to the humidity.

C. the control of fresh air volume: the air volume control is obtained by the proportional adjustment of the air valve, maintaining the air volume at 50 cm$^3$/person/hour.

D. the signals such as accumulated computation, starting times, operating time, electricity metering of a motor and the like during the operating of the air conditioning unit is recorded and uploaded, wherein the main signals are listed below:

operation states of an air supply unit and a return air unit, air stream states of the air units, monitoring of the manual and automatic states, start-stop control;

feedbacks of the converters of the air supply unit and the return air unit, monitoring of the converter, the adjustment and control of the converter;

measurements of the temperature/humidity of the return air, $CO_2$ concentration measurements of the return air;

measurements of the temperature/humidity of the supplied air;

adjustment and control of a coil pipe water valve for cool and hot water;

adjustment and control of a fresh air valve and a return air valve;

adjustment and control of a humidity valve.

E. energy-saving control for the motor: the converter is adjusted by the controller such that the rotating speed of the motor is reduced as much as possible while the fresh air volume is maintained so as to attain the energy-saving control in a case where the indoor air supply volume required is changed.

3) Energy Management Control Based on Cloud Computing

Initially, it is determined at the cloud computing control and analysis platform that whether the collected parameters and the user defined parameters are matched with each other; if they are matched with each other, the current control mode is maintained and the total energy consumption of the whole building and the energy consumption of the respective parameter index are calculated and added up to generate the energy consumption models; and if they are unmatched with each other, the control mode needs to be adjusted in time. The main parameter indexes to be considered are as below:

aggregate index of energy consumption in building;
aggregate index of conventional energy consumption;
aggregate index of energy consumption for special region;
index of energy consumption in heating ventilation and air conditioning system:
  i) index of energy consumption in a ventilation system of the air conditioner; ii) index of energy consumption in a heat supply system;
index of energy consumption in an illumination system:
  i) ordinary illumination; ii) emergency illumination; iii) landscape illumination;
index of energy consumption of indoor devices;
index of energy consumption of comprehensive service system;
index of aggregate water consumption in the building, and the like.

Thereafter, it is determined at a cloud computing operation data model platform whether the generated energy consumption model complies with the trade standards. If the determination result is negative, the control mode needs to be adjusted to further reduce the energy consumption. Specifically, the generated energy consumption model is compared with the corresponding history energy consumption models from the various history energy consumption models complying with the respective trade standard (i.e., the design standard) that exist in the cloud computing operation data model platform. If the energy consumption is higher than that of the corresponding history energy consumption model, the control mode needs to be adjusted; and if the energy consumption is lower than that of the corresponding history energy consumption model, the current control mode remains unchanged and the generated energy consumption model is added as the history energy consumption model. The following common control models are presented as reference.

A. Indoor Temperature and Humidity Control Model

The temperature and humidity control model having different control details are built up depending on different types of buildings to improve the control accuracy. The essential basis is to set floating set points for heat load compensation curve, i.e. adjusting the set value of indoor temperature automatically in such a more effective manner that the energy is saved as much as possible over the range permitted by the load of the building.

The change in the indoor temperature and humidity is closely correlated with the energy saving of the building. It is indicated by the statistical data from U.S. National Bureau of Standards that the energy consumption is increased by 9% if the set value of the temperature is lowered by 1° C. in summer; while the energy consumption is increased by 12% if the set value of the temperature is raised by 1° C. in winter. Accordingly, the indoor temperature and humidity being controlled within the range of the accuracy of the set value will be the effective measures for energy saving of the air conditioner.

The control accuracy of the indoor temperature and humidity can be attained as desired so that the change in the temperature is in the range of ±1.5° C. and the change in the humidity is in the range of ±5%. As such, overlow indoor temperature in summer (lower than standard set value) or overhigh indoor temperature in winter (higher than standard set value) can be avoided to a possible extent whereby the energy saving is achieved.

B. Outdoor Climate Compensation Adjustment Model

The settings of the indoor temperature is changed according to the change in the outdoor temperature and humidity and the seasonal variation by the cloud computing energy management control platform so as to make the air conditioner function in sufficient way and further meet the demands of human. The whole fresh air system is activated and the cool and hot water supply is stopped when the outdoor temperature reaches an appropriate enthalpy value, or the free-of-charge refrigeration system is activated and the main engine of the air conditioner is turned off when the enthalpy value is lower than a certain value.

C. Control Model for Fresh Air Volume

Each person in the building should be guaranteed a certain amount of fresh air volume in light of hygienic requirements. However, the energy consumption caused by fresh air will be increased when too much fresh air is obtained. For instance, coping with the outdoor fresh air of one kilogram needs cool energy of 6.5 kWh and heat energy of 12.7 kWh under the designed operating conditions (the outdoor temperature in summer is 26° C., the relative temperature is 60%, the indoor temperature in winter is 22° C. and the relative humidity is 55%, for example). As a result, obvious energy-saving effect is obtained by reducing the fresh air volume while the indoor hygienic requirements are satisfied. The implementation of the fresh air volume control model involves essentially several control elements as described below:

i) the fresh air volume is determined from the indoor permitting concentration of carbon dioxide ($CO_2$), and the value of which typically is 0.1% (1000 ppm). Further, the fresh air volume is adjusted automatically based on the concentration of indoor $CO_2$ or in the return air so as to ensure the freshness of the indoor air. The building device automated system with relatively complete control functions may meet these control requirements;

ii) a fresh air valve control model is build up according to the rule of variation of personnel within the building by adopting the method of statistics to determine the operation program by the corresponding time for performing process control on the fresh air valve, thereby controlling the fresh air volume;

iii) adjusting and influencing the controlled temperature by a ratio of fresh air to return air is not used as the main basis for adjusting the fresh air valve. The adjustment of the temperature is primarily completed by an adjusting valve for the surface cooler. If the adjustment of the air valve is based on the temperature, the control on two devices is affected by one parameter simultaneously and makes an effort to stabilize the parameters, resulting in the self-activation of the system, which causes the system to be unstable or hardly stable. Thus, the dead-zone value of fresh air adjusting temperature can be amplified such that the air valve is coarsely adjusted and that the water valve is accurately adjusted. Furthermore, the percentage of the fresh air in the air supply volume should not be lower than 10% in the air conditioning system. The utilization of the fresh air volume is greater than or equal to 30 m$^3$/h per person regardless of the room area that each person occupies.

D. Control Model for Optimal Start-Stop of Electromechanical Devices

The unnecessary start-stop tolerant time of the air conditioner is reduced by the computation and self-adaptive control of the optimal start-stop time of the air conditioner in the cloud computing management control platform while a comfortable environment is guaranteed for the purpose of energy saving. Meanwhile, the turning off of the fresh air valve performed when pre-cooling or pre-heating can not only decrease the capacity of the devices, but also reduce the energy consumption caused by cooling or heating due to the acquisition of fresh air. An intermittent control method may be used for the air unit with less power or with soft starting. When used appropriately, the air unit operates only for 40 to 50 minutes per hour, obtaining a notable energy-saving effect. The operating time tends to be more reasonable when the energy-saving operation algorithm is adopted by the air conditioner device. The data records indicate that the accumulated time of factual energy supplying of each air conditioner is only about 2 hours per day (24 hours).

E. Control Mode for the Light Illumination System

A control for timely switching is performed on the public illumination devices, and the predetermined-program light adjusting control and window-border light adjusting control are performed according to the working time and the outdoor light. Thus, the energy consumption can be greatly reduced.

F. Control Model for the Electricity Price Difference between the Peak and Valley Values The cloud computing energy management control platform sets the reasonable cooling control strategy for ice storage with sufficient use of the policy of the electricity prices at the peak and valley, and selectively removes the certain electromechanical devices in the building which are relatively not important so as to reduce the rush load, or applies the emergency electrical generators and releases the stored cool energy and the like, during the rush period for the electric use. As a result, the operation may keep away from the rush period, and the operation expense can be reduced.

G. Control for the Balance and the Variable Flow Rate of the Water System of the Air Conditioner Depending on the nature of heat exchange for the conditioner system, in which a certain flow rate of water makes a heat exchange with the air supply flow driven by the air unit through the surface cooler, the efficiency for the energy exchange is not only related to the influence of the air velocity and the temperature of the surface cooler on the heat efficiency, but also related to the flow rate of the supplied cool and heat water and the heat efficiency.

From the analysis for the flow rate and the measurement parameters of the control effects of the air conditioners on the most distal and most proximal ends, which refer to the ends relative to the water supplied and returned in the air conditioning system and the water collector, of the air conditioning system under different energy supply states and different operation states by the cloud computing management control platform, it can be seen that the air conditioning system has an obviously dynamic characteristic in which the cloud computing energy management control system dynamically adjusts the adjusting valves of each air conditioner in operation according to the actual needs for the heat exchange, and the flow rate is controlled to change correspondingly. Therefore, the total value of the flow rate of the water supplied and returned is always in changing. In response to this change, the pressure difference of the water supplied and returned has to be adjusted to achieve a new balance. The mathematical model (arithmetic) for the control of the variable flow rate is established through the experiments and history data, and the water supplied and returned of the air conditioning system is changed from an open loop system to a closed loop system.

The experimental data indicates that, the pressure on the opposite ends of the adjusting valve is only 0.66 kg/cm$^2$-1 kg/cm$^2$ when the flow rate of the air processor arrives at the operating condition of a rated flow rate. The number of the water supply pumps in operation is dynamically adjusted according to the actual number of the air processors in operation and the operating condition of the flow rate in operation, with the fine adjustment of the by-pass valve, the manner of control for the variable flow rate is achieved. Therefore, it is possible to avoid the leakage, improve the precision for the control and reduce the unnecessary loss of the flow rate and the power redundancy, and thereby the effect of energy saving is brought about, which is above 25% according to the actual data computation. The operating condition of the cool-water unit is adjusted, with dynamical parameter for the flow rate of the water supplied and returned as a feedback amount, so that an obvious energy-saving effect is achieved.

Since the intelligent buildings dynamically adjust the operation of the devices by scientifically using the energy-saving control mode and the algorithm of the cloud computing management control platform, a problem of the energy waste caused by the device capacity and the dynamical redundancy brought about by the design of the heating ventilation is overcome effectively. According to the statistic, in the adjustment of the heat supplying system, the temperatures of the supplied water and the returned water in the boiler room are determined by the daily average air temperature forecast within 48 hours, compared with the heat supply at experience, about 3% of the energy may be saved on a condition that room temperature is not lower than 18° C. 3%-5% of the energy can be saved as long as the manner of climate compensation is adopted; and the heat supply portion of the present system can automatically detect the outdoor temperature and collect the indoor temperature as the importance bases for the heat supply loads, and the energy saved in the season for heat supply is not below 5%.

H. Control Model for Spring and Autumn Transition Mode i) recordings of a history outdoor computed (dry-bulb) temperature at local region, ii) whether a daily average outdoor temperature reaches 10° C.; when the above two conditions are satisfied, the spring transition seasonal mode is started. At this time, the magnitude of the fresh air volume of the air conditioning unit is adjusted automatically based on the schedule by the system so as to ensure the indoor comfortable sense.

When the highest temperature at outdoor is above 26° C., the control mode for autumn transition is started by the system in which the night blowing method is used, making sufficient use of outdoor cool air to clean the room and bring away the residual heat in the room. The blowing time can be adjusted as the climate changes. The night blowing system has the heat load curve as the primary reference other than a time program.

i) recordings of a history outdoor (dry-bulb) temperature at local region, ii) whether a daily average of outdoor temperature reaches 8° C.; when the above two conditions are satisfied, the autumn transition seasonal mode is started. At this time, the magnitude of the fresh air volume of the air conditioning unit is adjusted automatically based on the heat and humidity load curve in operation and the schedule by the system. If the maximum of outdoor temperature is below 15° C., however, the control mode for spring transition is started by the system in which the night blowing method is cancelled.

I. Control Model of Equivalent Temperature and Region

Human body is sensitive to the temperature, but is quite torpid to the relative humidity. Particularly, the reaction of the human body to humidity is torpid when the relative humidity is in a range of 35% to 65%, for example, but is extreme intense when the relative humidity is in a range of higher than 65% or lower than 35%. It is not the temperature only but the comfortable sense that is employed as the control index during the energy management control, namely, an equivalent temperature is used as the control index (T=25° C., φ=50%, for example). A regional control method may be alternatively selected in addition to the equivalent temperature as the control index, that is, the human body feels comfortable within certain regions of environment. Hence, it is unnecessary for the equivalent temperature to be controlled at one point but within a certain range, and thus the system can be easily stabilized and save energy effectively. In this way, the annual energy saving can be increased by 10% than in the case of the ordinary scenario.

There are various kinds of model algorithms of the cloud computing management control platform, comprising the periodical algorithms including algebra computation, total value computation, device operating time, Boolean operation, data integration, sectional linear function, maximum and minimum values recordation and the like, and the event trigger algorithm including report form task and event display, site group control, region or group warning, warning for the combination structure and the like. The algorithm is selected according to the specific needs in use, and the control models are established.

Figure 2:
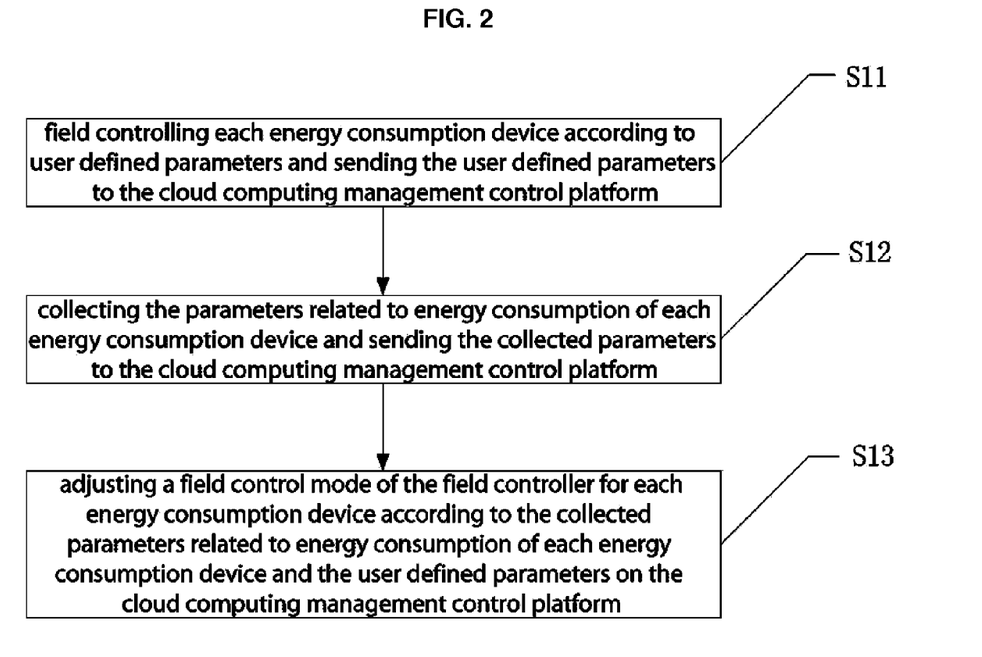
FIG. 2 is the flow chart schematically illustrating an energy management control method based on cloud computing according to an embodiment of the present invention.

FIG. 2 is the flow chart schematically illustrating an energy management control method based on cloud computing according to an embodiment of the present invention. The method comprises:

a step S11 of field controlling each energy consumption device according to user defined parameters and sending the user defined parameters to the cloud computing management control platform;

a step S12 of collecting parameters related to energy consumption of each energy consumption device and sending the collected parameters to the cloud computing management control platform; and wherein, the parameters related to energy consumption of each energy consumption device include the real-time energy consumption parameters, the operating parameters and the safety parameters, in which the real-time energy consumption parameters usually refer to the parameter of quantity of electricity of each energy consumption device directly collected by the electricity metering device, the operating parameters include the temperature, humidity, air volume, operating time, frequency and the like, which are parameters related to the operation of each energy consumption device, and the safety parameters include the related parameters for each energy consumption device in the case of in operation, in malfunction, warning and the like; the parameters related to energy consumption of each energy consumption device are sent to the cloud computing management control platform through any one of wireless Internet network, wired Internet network, general packet radio service network and third generation mobile communication network;

a step S13 of adjusting a field control mode for each energy consumption device according to the collected parameters related to energy consumption of each energy consumption device and the user defined parameters though the cloud computing management control platform.

As the energy management control is performed with the use of the cloud computing management control platform, the grand-scale energy consumption centralized control may be achieved due to the scalability and extendibility characteristic of the cloud computing. Theoretically, any kind of the energy management control around the world may be achieved, including the energy consumption management control for the buildings, the energy consumption management control for power transmission and so on. Therefore, a wider application range may be obtained. The energy management control may be performed by each user due to the characteristic of virtualization of the cloud computing, without an individual configuration of a separate energy management control platform. Rather, it can be obtained in the "cloud" as needed. Therefore, the cost is substantially reduced. The history data within the whole control platform is quite rich as a result of the characteristic of the resource sharing of the cloud computing. The optimal history data may be matched as a reference, so that the optimal deployment the energy may be achieved.

Figure 3:
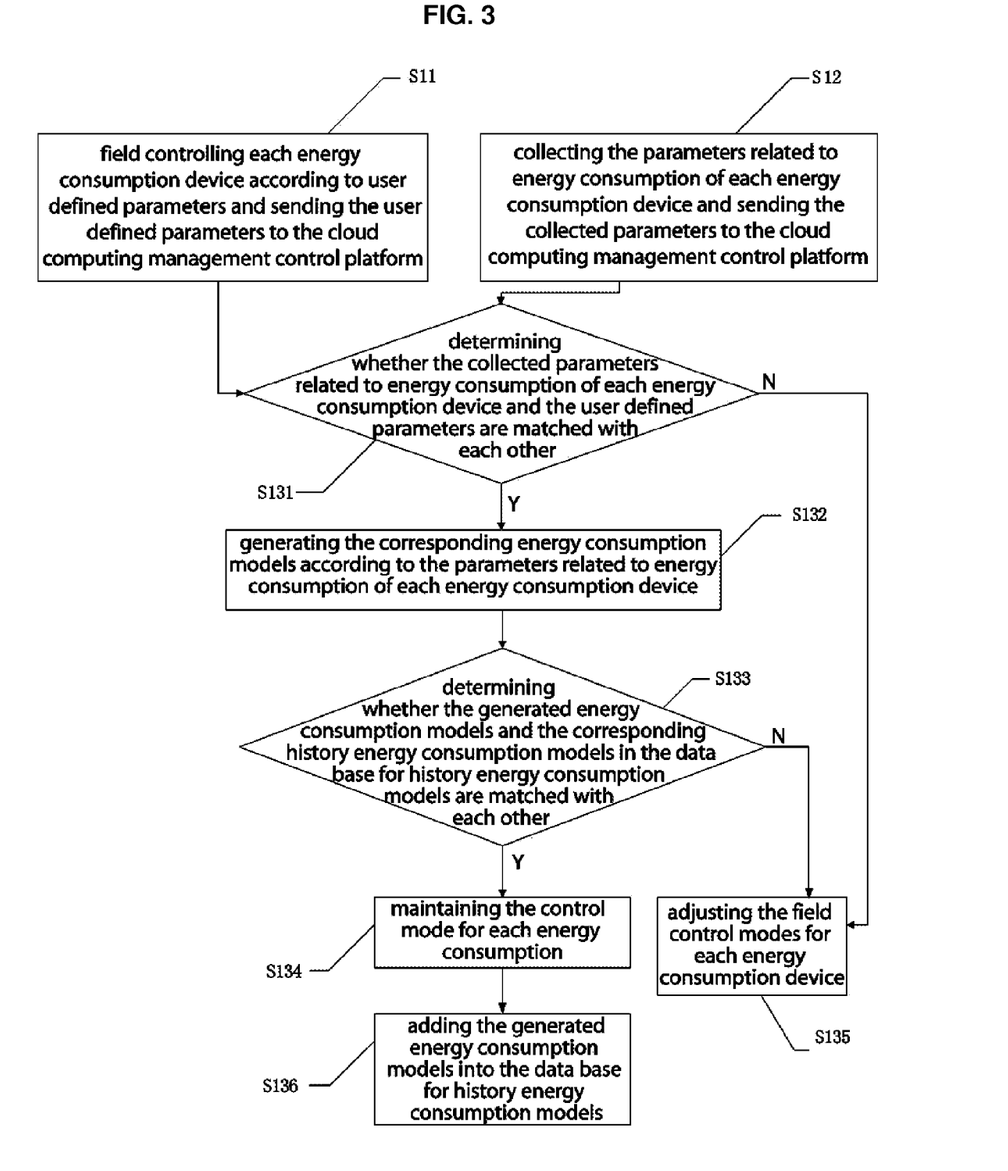
FIG. 3 is the flow chart schematically illustrating an energy management control method based on cloud computing according to another embodiment of the present invention.

FIG. 3 is the flow chart schematically illustrating an energy management control method based on cloud computing according to another embodiment of the present invention. This method is based on the energy management control method based on cloud computing shown in FIG. 2, and the step S13 specifically comprises:

a step S131 of determining whether the collected parameters related to energy consumption of each energy consumption device and the user defined parameters are matched with each other, performing a step S135 if they are unmatched with each other, and performing a step of S132 if they are matched with each other;

the step S132 of generating the corresponding energy consumption models according to the parameters related to energy consumption of each energy consumption device;

a step S133 of determining whether the generated energy consumption models and the corresponding history energy consumption models in the data base for history energy consumption models are matched with each other, performing the step S135 if they are unmatched with each other, and performing a step S134 of maintaining the control mode for each energy consumption if they are matched with each other, wherein the corresponding history energy consumption models in the data base refer to the history energy consumption models where the energy consumption restriction parameters, which include one of the application environment parameters, design parameters, the application place-type parameters and the energy supply-type parameters of each energy consumption device or the combination thereof, and the generated energy consumption models are matched with each other; and the step S135 of adjusting the field control modes for each energy consumption device.

The method further comprises a step S136 of adding the generated energy consumption models into the data base for history energy consumption models following the step S134, so as to enrich the history data and make a reference for the later energy consumption management control.

For more details, refer to the above description in the embodiment of energy management control system based on cloud computing.

The method of the present embodiment specifically provides a method for adjusting the control mode of the field controller for each energy consumption device on the cloud computing management control platform, on a basis of the energy management control method based on cloud computing shown in FIG. 2, which further optimizes the energy consumption models and reduces the energy consumptions with sufficient use of the characteristic of the rich history data of the cloud computing management control platform.

The above embodiments are only exemplified embodiments of the present invention, and do not make any limitation to the present invention. The protection scope of the present inventions is defined by the appended claims. The skilled person in the art can make various modifications and equivalent substitutions for the present invention within the spirit and protection scope of the present invention, and such modifications and equivalent substitutions still fall within the protection scope of the present invention.

The invention claimed is:

1. An energy management control system based on cloud computing, comprising:
    a field controller including a user parameter defining unit for defining user defined parameters, the field controller being used for field controlling each energy consumption device according to the user defined parameters and sending the user defined parameters to a cloud computing management control platform;
    an energy consumption parameter collector for collecting parameters related to energy consumption of each energy consumption device and sending the collected parameters to the cloud computing management control platform; and
    the cloud computing management control platform for adjusting a field control mode of the field controller for each energy consumption device according to the collected parameters related to energy consumption of each energy consumption device and the user defined parameters, the cloud computing management control platform comprising:
        a receiving unit for receiving the parameters related to energy consumption of each energy consumption device collected by the energy consumption parameter collector and the user defined parameters;
        a first determining unit for determining whether the collected parameters related to energy consumption of each energy consumption device and the user defined parameters are matched with each other and generating a determination result;
        an energy consumption model generating unit for generating corresponding energy consumption models according to the parameters related to energy consumption of each energy consumption device when the determination result of the first determination unit is positive;
        a data base for history energy consumption models for storing various types of history energy consumption models;
        an energy consumption restriction parameter setting unit through which the user inputs energy consumption restriction parameters of the generated energy consumption model;
        a second determining unit for searching the data base for history energy consumption models for the corresponding history energy consumption models according to the energy consumption restriction parameters input by the user and then determining whether the generated energy consumption models and the corresponding history energy consumption models in the data base for history energy consumption models are matched with each other and generating the determination result, and if matched as the result of determination made by the second determining unit, adding the generated energy consumption models into the data base for history energy consumption models; and
        a control mode adjusting unit for adjusting the field control mode of the field controller for each energy consumption device when the determination result of the first determination unit or the second determination unit is negative.

2. The energy management control system based on cloud computing according to claim 1, wherein the parameters related to energy consumption of each energy consumption device include real-time energy consumption parameters, operating parameters and safety parameters.

3. The energy management control system based on cloud computing according to claim 1, characterized in that the corresponding history energy consumption models in the data base for history energy consumption models refer to the history energy consumption models including energy consumption restriction parameters, which include one of application environment parameters, design parameters, application place-type parameters and energy supply-type parameters of each energy consumption device or the combination thereof, and the generated energy consumption models are matched with each other.

4. An energy management control method based on cloud computing, characterized by comprising:
    field controlling each energy consumption device according to user defined parameters and sending the user defined parameters to a cloud computing management control platform;

collecting the parameters related to energy consumption of each energy consumption device and sending the collected parameters to the cloud computing management control platform;

adjusting a field control mode of the field controller for each energy consumption device according to the collected parameters related to energy consumption of each energy consumption device and the user defined parameters on the cloud computing management control platform, wherein adjusting a field control mode of the field controller for each energy consumption device comprises:

determining whether the collected parameters related to energy consumption of each energy consumption device and the user defined parameters are matched with each other;

if the collected parameters related to energy consumption of each energy consumption device and the user defined parameters are matched with each other, generating the corresponding energy consumption models according to the parameters related to energy consumption of each energy consumption device;

if the collected parameters related to energy consumption of each energy consumption device and the user defined parameters are unmatched with each other, adjusting the field control modes for each energy consumption device;

searching a data base for history energy consumption models for the corresponding history energy consumption models according to energy consumption restriction parameters input by the user and then determining whether the generated energy consumption models and the corresponding history energy consumption models in the data base for history energy consumption models are matched with each other;

if the generated energy consumption models and the corresponding history energy consumption models in the data base for history energy consumption models are matched with each other, maintaining the control mode for each energy consumption device and adding the generated energy consumption models into the data base for history energy consumption models; and if the generated energy consumption models and the corresponding history energy consumption models in the data base for history energy consumption models are unmatched with each other, adjusting the field control modes for each energy consumption device.

5. The energy management control method based on cloud computing according to claim 4, characterized in that the corresponding history energy consumption models in the data base for history energy consumption models refer to the history energy consumption models including energy consumption restriction parameters, which include one of application environment parameters, design parameters, application place-type parameters and energy supply-type parameters of each energy consumption device or the combination thereof, and the generated energy consumption models are matched with each other.

6. The energy management control method based on cloud computing according to claim 4, wherein the parameters related to energy consumption of each energy consumption device include real-time energy consumption parameters, operating parameters and safety parameters.

7. The energy management control method based on cloud computing according to claim 4, wherein the parameters related to energy consumption of each energy consumption device each are sent to the cloud computing management control platform through any one of wireless Internet network, wired Internet network, general packet radio service network and third generation mobile communication network.

* * * * *